Patented May 18, 1943

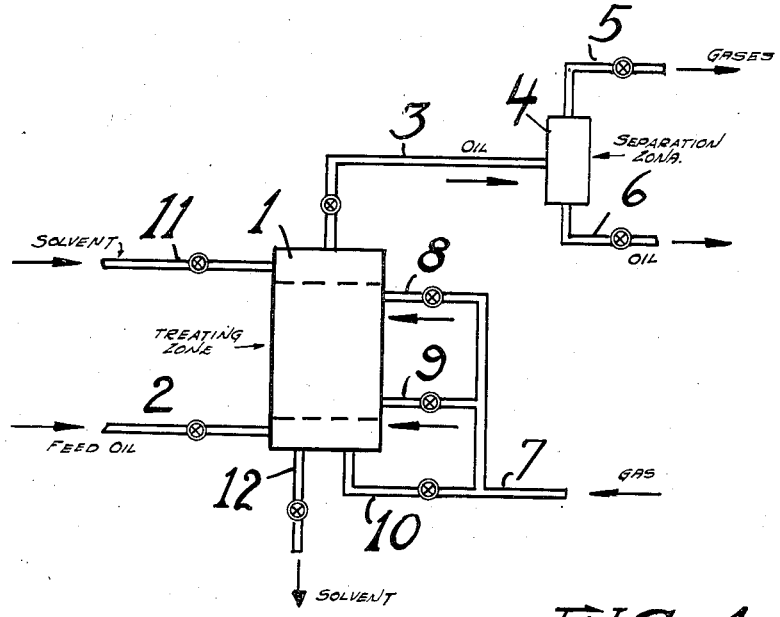
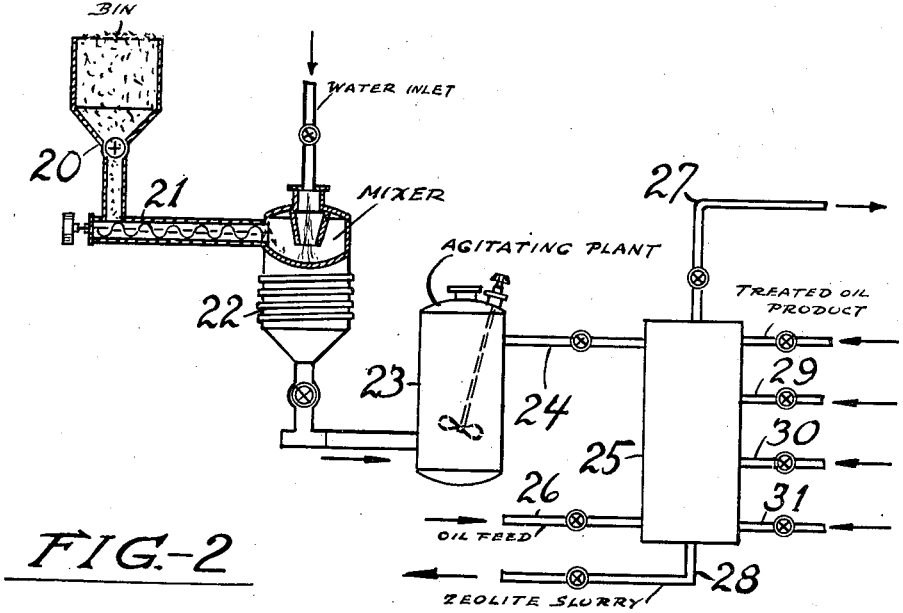

2,319,738

UNITED STATES PATENT OFFICE 2,319,738

REFINING MINERAL OILS

Minor C. K. Jones, Westfield, N. J., assignor to Standard Oil Development Company, a corporation of Delaware Application December 28, 1940, Serial No. 372,025

2 Claims. (Cl. 196—29)

The present invention relates to the refining of oils. The invention is more particularly concerned with the removal of objectionable sulfur compounds and peroxides from hydrocarbon oils, as for example, from petroleum oils boiling in the motor fuel, kerosene and gas oil boiling ranges. In accordance with the present process, petroleum oils boiling in this range are contacted with a solid reagent selected from the class of alkali metal aluminum silicates of the zeolite type. A particularly desirable adaptation of the present process is to countercurrently contact the feed oil with a slurry of zeolite under conditions in which a gas phase is passed countercurrently to the zeolite slurry and concurrently with the oil being treated.

It is known in the art to treat mineral oils, particularly petroleum oil distillates and the like, with various contacting masses such as clay, aluminum oxides and other metallic oxides under various temperature and pressure conditions in order to remove objectionable sulfur and related sulfur-containing compounds. For example, a conventional procedure for the removal of sulfur compounds from petroleum oils boiling in the motor fuel boiling range is to pass the oil in the vapor or liquid phase over a catalyst comprising bauxite under varying temperature and pressure conditions. The desulfurized oil is generally subsequently treated in a manner to improve its color and color stability. This latter operation is usually accomplished by clay-contacting the oil in any desirable manner. It is also known to use various other solid substances for the removal of sulfur compounds from feed oils containing the same, which due to their nature have not been particularly effective for the production of high quality desulfurized products.

I have now discovered a process by which it is possible substantially completely to remove undesirable sulfur compounds, particularly mercaptans, and various peroxides from mineral oils containing the same in an efficient and economical manner. My process comprises contacting the sulfur-containing oil with a solid reagent selected from the class of alkali metal aluminum silicates of the zeolite type. My process not only efficiently and economically removes the undesirable sulfur compounds, but also produces a high quality desulfurized product having improved odor, color, color stability, a relatively low gum content, and a improved octane number, as well as an improved susceptibility for knock-suppressing agents such as tetraethyl lead. I have discovered that providing feed oils containing these objectionable constituents be contacted with an alkali metal aluminum silicate of the zeolite type, as for example, sodium zeolite or potassium zeolite, these constituents will be removed and the treated product will require a less severe clay treatment and in many instances may entirely by-pass clay treating, thus effecting increased yields and materially reducing manufacturing costs. A particularly desirable adaptation of the operation comprises countercurrently contacting the feed oil with a slurry of zeolite under conditions in which a gas is passed countercurrently to the slurry of zeolite.

The process of my invention may be readily understood by reference to the attached drawing illustrating modifications of the same.

Figure 1 illustrates a modification of the invention employing a zeolite bed, while Figure 2 illustrates a preferred adaptation utilizing a slurry of the zeolite and countercurrently contacting the oil with the presence of an added gas flowing concurrently with the oil. Referring specifically to Figure 1, it is assumed for purposes of illustration that the feed oil comprises a peroxide and mercaptan-containing petroleum oil boiling in the motor fuel boiling range. This oil is introduced into treating zone 1 by means of line 2. The feed oil flows upwardly through the bed of zeolite maintained in contacting zone 1 and is withdrawn overhead by means of line 3. Temperature and pressure conditions are adjusted in zone 1 to secure the desired removal of the objectionable constituents from the oil and to secure a maximum yield of a high quality product. The zeolite-contacted oil is withdrawn from zone 1 by means of line 3 and passed into separation zone 4 in which a separation is made between any gases which form and the liquid. The gases are withdrawn from zone 4 by means of line 5 while the contacted oil is withdrawn by means of line 6 and further refined and handled in any manner desirable. The preferred modification of the present operation is to introduce into contacting zone 1 a gas preferably at a plurality of points by means of lines 7, 8, 9, and 10. It is to be understood that contacting zone 1 may comprise any suitable number and arrangement of contacting units. It is also to be understood that the zeolite may be regenerated in any suitable manner, usually by washing with a solvent which is introduced into contacting zone 1 by means of line 11 and withdrawn by means of line 12.

Referring specifically to Figure 2, it is assumed that the feed oil comprises an oil similar to that described with respect to Figure 1. The zeolite preferably comprises a powdered zeolite, which is withdrawn from storage bin 20, passed by suitable conveying means 21 to a mixing zone 22 in which the zeolite is mixed with a sufficient quantity of water or other suitable liquid. The mixture is passed through agitating zone 23 in which complete mixing of the zeolite and water is secured in order to form the desired slurry. The slurry is withdrawn from agitating zone 23 by means of line 24 and introduced into the top of a countercurrent contacting zone 25. The feed oil is introduced into zone 25 by means of line 26. The oil flows upwardly through zone 25 and countercurrently contacts the downflowing slurry of zeolite. Temperature and pressure conditions are adjusted in zone 25 to secure the desired removal of the objectionable compounds from the feed oil. The treated oil is removed from zone 25 by means of line 27 and further refined and handled in any manner desirable. The spent zeolite slurry is withdrawn from zone 25 by means of line 28 and handled in a manner to regenerate the same. This is preferably accomplished by recovering and segregating the desired constituents which are removed from the feed oil. In accordance with the preferred adaptation of the invention, a gas is introduced into zone 25 preferably at a plurality of points by means of lines 29, 30 and 31. In certain operations, it may be desirable to use an oil slurry of the zeolite. If this type of operation be employed the oil slurry and the feed oil are introduced at the top of a treating zone. The oil slurry and the feed oil flow in a concurrent relationship downwardly through said treating zone and preferably contact an upflowing gas which is introduced as previously described.

The process of the present invention may be widely varied. The invention may be employed in the removal of sulfur compounds and peroxides from any mineral feed oil containing the same. It is, however, particularly adaptable for the removal of relatively low boiling mercaptans, and organic peroxides from petroleum oils boiling in the range below about 700° F., particularly in the motor fuel boiling range.

Although any alkali metal aluminum silicate is satisfactory, the preferred materials are the naturally-occurring alkali metal zeolites. In certain operations it is also desirable that these naturally-occurring alkali metal zeolites be of the hydrated variety. A particularly desirable substance comprises a naturally-occurring hydrated sodium aluminum silicate, which may be represented by the formula:

$NaH_6AlSiO_7$ or by the formula:

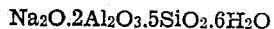

$Na_2O.2Al_2O_3.5SiO_2.6H_2O$

Although these treating reagents may be employed in the naturally-occurring state, they are preferably surface conditioned by subjecting the same to a preheat treatment. In general this preheat treatment is conducted under conditions which will not affect the chemical combination of the substances and which will not produce any substantial dehydration of the same. The preheat treatment may be carried out at atmospheric pressure and at a temperature in the range from about 500° F. to about 1200° F., preferably in the range from about 800° F. to about 900° F.

The temperature at which the zeolite and oil are contacted may vary widely. However, in general, it is preferred to employ treating temperatures in the range from about 60 to about 100° F., preferably temperatures in the range from about 70 to about 80° F. Although elevated pressures may be employed, in general, it is preferred to employ atmospheric pressure.

The oil feed rate per volume of reagent will be a function of the particular reagent utilized, the character of the feed oil, the type and concentration of the sulfur compounds present, and upon general operating conditions. When employing a naturally-occurring hydrated sodium zeolite, the surface of which has been prepared by a suitable preheat treatment for the removal of sulfur compounds from petroleum oils boiling in the motor fuel boiling range, the feed rates are preferably from about 0.5 to 2.0 volumes of oil feed per volume of reagent per hour.

In order further to illustrate the invention, the following examples are given which should not be construed as limiting the same in any manner whatsoever.

EXAMPLE 1

A petroleum oil distillate boiling in the gasoline boiling range, having a mercaptan content of 30 mg./100 ml. of oil was contacted by percolation at atmospheric temperatures and pressures with sodium zeolite of the "Permutit" type, at a rate of one liquid volume per reagent volume per hour. The treated distillate was sweet to the doctor test and passed the copper strip corrosion test. All mercaptan sulfur was removed. Treated oil had an improved color, an improved color stability, the total sulfur was reduced, and the susceptibility of the same for tetraethyl lead was improved. Furthermore, the treated product did not have a lower clear octane number than the untreated feed distillate.

The zeolite containing the removed mercaptan was treated with steam at 800° F., the steam was removed overhead and condensed along with a non-miscible liquid. The zeolite was completely regenerated by this procedure and its activity restored to its original level.

Another portion of the zeolite was regenerated by steaming at 212° F. followed by washing with water and then drying with hot inert gas.

EXAMPLE 2

Other operations similar to those described with respect to Example 1 were conducted on a West Texas heavy naphtha containing 85 mg./100 ml. of mercaptan sulfur. After contacting this feed oil in a once-through operation, the mercaptan content of the same was reduced to 20 mg./100 ml. of mercaptan sulfur. The mercaptan sulfur was completely removed from the feed oil by passing the same through a second-stage apparatus similar to stage 1.

EXAMPLE 3

A distillate heating oil boiling between 400 and 650° F. was found not to pass the copper strip corrosion test and to have an unsatisfactory odor. After filtration of this oil through a bed of sodium zeolite, the oil passed this test, no discoloration of the copper strip being evident after 1 hour immersion in the oil at 212° F., and had a good odor.

EXAMPLE 4

A sour petroleum naphtha was fed at a rate of one liquid volume per reagent volume per hour to two similar filter chambers, containing sodium zeolite and Attapulgas clay, respectively. Prior to activation, these materials had the following compositions:

Composition of reagent

|  | Material trade name | |
|---|---|---|
|  | Sodium zeolite Super-Zeo-Dur | Clay Attapulgas |
| Mesh | 10-30 | 30-60 |
| Ignition loss | 8.50 | 21.25 |
| $Al_2O_3$ | 5.69 | 10.06 |
| $SiO_2$ | 45.65 | 53.42 |
| $Fe_2O_3$ | 27.11 | 3.40 |
| CaO | 2.02 | 1.29 |
| MgO | 4.74 | 9.16 |
| $Na_2O$ | 1.51 |  |
| $TiO_2$ |  | 0.52 |
| Undetermined | 4.78 | .90 |
| Total | 100.00 | 100.00 |

Inspections of the feed gasoline, and this gasoline after contact with the two materials were as follows:

Inspection of gasoline before and after zeolite and clay treatments

|  | Feed | After zeolite | After clay |
|---|---|---|---|
| I. B. P | 130° F |  |  |
| F. B. P | 420° F |  |  |
| RSH content | 36 mg/100 ml | None | 36 mg/100 ml |
| S content | 0.231% | 0.180% | 0.232%. |
| Doctor test | DNP | Pass | DNP. |

These data show sodium zeolite to be effective for removal of mercaptans from gasoline, while similar filtration through a non-zeolitic clay did not yield a sweet product and was ineffective. This clay is the type widely used in the clay treatment of petroleum oils for color improvement, but does not accomplish mercaptan removal, differentiating the present invention from so-called clay treating.

EXAMPLE 5

A gasoline of 22 peroxide number (the gram equivalents of active oxygen per 1000 liters) was filtered through a bed of heat-treated natural zeolite, designated by the trade-name Super-Zeo-Dur, at atmospheric temperature and at a rate of 1 v./v./hr. The first four volumes of gasoline through the zeolite showed a peroxide number of 0.2. The fifth and sixth volumes showed 3.5 and 11.4 peroxide numbers, respectively. After removal of the peroxides to a low value as indicated by the first four volumes it is desirable to inhibit the treated product with a suitable anti-oxidant to prevent further rapid deterioration. Such organic peroxides recovered during regeneration of the zeolite are useful in several applications.

The above-described procedures may be varied considerably. It has been found that an effective modification of the present invention is a percolation of a sour gasoline through zeolite which has been treated previously with a solution of a metallic salt. This modification includes all types of natural or synthetic zeolites and solutions of any salt of a metal capable of reversible oxidation and reduction upon cyclic contact with sour gasoline and air or oxygen.

Particularly desirable results are secured when a gas comprising an oxygen-containing gas is used in conjunction with the zeolite. In employing this type of operation, it is preferred to introduce the oxygen-containing gas at a plurality of stages in order to more positively control the reaction. A satisfactory gas comprises air.

What I claim as new and wish to protect by Letters Patent is:

1. Process for the refining of petroleum oils boiling in the motor fuel boiling range which comprises contacting a liquid feed petroleum oil in a contacting zone with a countercurrently flowing slurry of an alkali metal aluminum silicate of the zeolite type, in the presence of an oxygen-containing gas which is flowing concurrently with the oxygen-containing petroleum oil.

2. Process as defined by claim 1, in which said alkali metal aluminum silicate of the zeolite type comprises sodium aluminum zeolite and in which said oxygen-containing gas is introduced into said contacting zone at a plurality of points.

MINOR C. K. JONES.